US009697045B2

(12) United States Patent
Amaral et al.

(10) Patent No.: US 9,697,045 B2
(45) Date of Patent: Jul. 4, 2017

(54) SELECTING RESOURCE ALLOCATION POLICIES AND RESOLVING RESOURCE CONFLICTS (71) Applicants: International Business Machines Corporation, Armonk, NY (US); Barcelona Supercomputing Center—Centro Nacional de Supercomputación, Barcelona (ES)

(72) Inventors: Marcelo Amaral, Barcelona (ES); Yurdaer N. Doganata, Chestnut Ridge, NJ (US); Iqbal I. Mohomed, Stamford, CT (US); Asser N. Tantawi, Somers, NY (US); Merve Unuvar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/667,374

(22) Filed: Mar. 24, 2015

(65) Prior Publication Data
US 2016/0283270 A1    Sep. 29, 2016

(51) Int. Cl.
G06F 9/50    (2006.01)

(52) U.S. Cl.
CPC .................. *G06F 9/5005* (2013.01)

(58) Field of Classification Search
CPC ................................................. G06F 9/5005
See application file for complete search history.

(56) References Cited

U.S. PATENT DOCUMENTS

| 7,793,293 | B2 | 9/2010 | Norton et al. |
| 7,996,353 | B2 | 8/2011 | Chan et al. |
| 8,032,623 | B2 | 10/2011 | Colby et al. |
| 8,156,502 | B1 * | 4/2012 | Blanding .................. G06F 9/50 718/100 |
| 8,762,304 | B2 | 6/2014 | Chitapur et al. |
| 2004/0078455 | A1 | 4/2004 | Eide et al. |
| 2006/0048161 | A1 | 3/2006 | de Rose et al. |
| 2008/0222640 | A1 * | 9/2008 | Daly ..................... G06F 9/4881 718/103 |

(Continued)

OTHER PUBLICATIONS

Anonymous, "A Dynamic Ranking Scheme for System Pool Placement Advisors based on Workload Requirements and Characteristics," IPCOM000220512D, Aug. 2, 2012.
(Continued)

*Primary Examiner* — Charlie Sun
(74) *Attorney, Agent, or Firm* — Mercedes L. Hobson; Michael J. Chang, LLC (57) ABSTRACT

Techniques for workload management in cloud computing infrastructures are provided. In one aspect, a method for allocating computing resources in a datacenter cluster is provided. The method includes the steps of: creating multiple, parallel schedulers; and automatically selecting a resource allocation method for each of the schedulers based on one or more of a workload profile, user requirements, and a state of the datacenter cluster, wherein an optimistic resource allocation method is selected for at least a first one or more of the schedulers and a pessimistic resource allocation method is selected for at least a second one or more of the schedulers. Due to optimistic resource allocation conflicts may arise. Methods to resolve such conflicts are also provided.

18 Claims, 5 Drawing Sheets

(56) References Cited

U.S. PATENT DOCUMENTS

| | | | |
|---|---|---|---|
| 2009/0327494 A1 | 12/2009 | Ben-Ezra et al. | |
| 2010/0083248 A1* | 4/2010 | Wood | G06F 9/5077 718/1 |
| 2012/0226788 A1 | 9/2012 | Jackson | |
| 2012/0331152 A1 | 12/2012 | Tatsubori et al. | |
| 2013/0081039 A1 | 3/2013 | Glew et al. | |
| 2013/0198755 A1 | 8/2013 | Kim et al. | |
| 2013/0246208 A1* | 9/2013 | Jain | G06F 9/50 705/26.3 |
| 2014/0143787 A1 | 5/2014 | Bostic et al. | |
| 2015/0012634 A1 | 1/2015 | Zhu et al. | |

OTHER PUBLICATIONS

Hassene Bouhouch et al., "Flexible Resources Reservation Scheme for Ad Hoc Networks," Information Theory and Information Security (ICITIS), pp. 932-936 (Dec. 2010).

* cited by examiner

Scheduler:

Pessimistic is
$B_i = A_i$

Semi-Pessimistic is
$A_i < B_i$

Optimistic is
$A_i = 0$

SELECTING RESOURCE ALLOCATION POLICIES AND RESOLVING RESOURCE CONFLICTS

FIELD OF THE INVENTION

The present invention relates to cloud computing infrastructures, and more particularly, to techniques for workload management in cloud computing infrastructures using parallel schedulers, and automated resource allocation and policy selector for conflict resolution.

BACKGROUND OF THE INVENTION

A cloud computing infrastructure has boosted the execution of mixed workloads in the same server, thus promoting better resource utilization and efficiency. However, it is still a challenge to fit heterogeneous workloads in the same cluster, e.g., when to schedule, where to place, and how to allocate their resources. Additionally, some workloads increase their resource usage on demand making the problem even harder to solve.

Current solutions for cluster management can be classified into three main scheduler architectures: (1) Monolithic, (2) Two-level, and (3) Shared-state. Monolithic schedulers use only a single centralized scheduling algorithm for all jobs, such as a High Performance Computing (HPC) scheduler. A Two-level scheduler is composed of a single active resource manager that offers resources to multiple, parallel, independent scheduler frameworks that accept or deny resources. See, for example, Hindman et al., "Mesos: A Platform for Fine-Grained Resource Sharing in the Data Center," Proceedings of the $8^{th}$ USENIX conference on Networked systems design and implementation (NSDI '11), pgs. 295-308 (March/April 2011). Shared-state architectures are composed of multiple, parallel schedulers that concurrently access the cluster resources as transactions. See, for example, M. Schwarzkopf et al., "Omega: flexible, scalable schedulers for large compute clusters," Proceedings of the $8^{th}$ ACM European Conference on Computer Systems (EuroSys '13), pgs. 351-364 (April, 2013) (hereinafter "Schwarzkopf"). There are notable trade-offs between these scheduler architectures. For instance, a Monolithic scheduler has total control of the cluster and might plan the best global placement, but is hard to diversify by adding a new policy and specialized implementation, and may not scale-up to the cluster size. Two-level schedulers are more flexible than Monolithic schedulers by providing scheduler parallelism, but they reduce the resource visibility and make decisions based on a holistic view of the cluster resources harder to perform (such as planning local placement for workloads, or performing workload migrations based on performance, energy efficiency and security). Moreover, when resources are pre-allocated for the schedulers, unused resources can be wasted. Shared-state has the global view of the cluster resources to make all the holistic decisions and is very scalable. However, a shared-state scheduler is very susceptible to resource racing and there is no way to guarantee resource allocation for some workloads.

Currently, no techniques are known that combine all of the advantages of the previous architectures and relieve the above-described drawbacks. In current approaches, the schedulers have all of the resources pre-allocated such as in the Monolithic and Two-level approach, or they only compete for resources such as in the Shared-state approach.

Further, complex schedulers bring about problems such as scalability, maintainability and flexible adaptation. To address this problem, the Shared-state approach (see, for example, Schwarzkopf) splits the complex scheduler into many smaller schedulers rather than having only one monolithic scheduler with all the workload's logic. On one hand, this Shared-state approach might be beneficial by providing a global view of the cluster for all workload deployment to possibly perform the best global deployment. It might also increase the scalability by responding to workload requests in parallel and it might reduce the response time (due to a reduced complexity). On the other hand, if multiple schedulers attempt to claim the same resource simultaneously, only one will be successful and the others will have to restart the scheduling process again. Hence, if conflicts occur too often, then the scheduling time and the response time will increase.

Certain techniques classify workloads, detect conflicts, or select general policies. See, for example, J. Bobba et al., "Performance Pathologies in Hardware Transactional Memory," Proceedings of the $34^{th}$ annual international symposium on Computer architecture (ISCA '07), pgs. 81-91 (June 2007); M. F. Spear et al., "Conflict Detection and Validation Strategies for Software Transactional Memory," Proceedings of the $20^{th}$ international conference on Distributed Computing (DISC '06), pgs. 179-193 (2006); and C. Delimitrou et al., "Paragon: QoS-Aware Scheduling for Heterogeneous Datacenters," Proceedings of the $18^{th}$ International Conference on Architectural Support for Programming Languages and Operating Systems (ASPLOS) (March 2013), respectively. However, a solution does not currently exist that collectively takes all of these factors into consideration to improve and automate workload conflicts resolution based on the infrastructure state. Moreover, the current solutions do not consider the specific capabilities that emerge from workload collisions in a shared-state cluster, such as application interferences, server overloading, etc.

Further, most current solutions for conflict detection and policy selection use linear programming which requires a large dataset for predictions, or machine learning which relies on enormous amounts of data for the test phase, neither of which are practical for real-world applications. Also, most current conflict detection and policy selection techniques do not perform well with missing entries. In that regard, some approaches exist that combine algorithms for matrix factorization for classification and log-likelihood function to fill in predictions for missing entries. These approaches do not however select a conflict resolution policy based on workload classification for resource usage intensiveness of central processing unit (CPU), memory, network, disk; workload execution time; and detection of possible non-deterministic and deterministic conflicts.

Accordingly, improved techniques for datacenter cluster workload management, including improved techniques for conflict detection and policy selection would be desirable.

SUMMARY OF THE INVENTION

The present invention provides techniques for workload management in cloud computing infrastructures. In one aspect of the invention, a method for allocating computing resources in a datacenter cluster is provided. The method includes the steps of: creating multiple, parallel schedulers; and automatically selecting a resource allocation method for each of the schedulers based on one or more of a workload profile, user requirements, and a state of the datacenter cluster, wherein an optimistic resource allocation method is selected for at least a first one or more of the schedulers and a pessimistic resource allocation method is selected for at least a second one or more of the schedulers.

In another aspect of the invention, another method for allocating computing resources in a datacenter cluster is provided. The method includes the steps of: creating multiple, parallel schedulers; automatically selecting a resource allocation method for each of the schedulers based on one or more of a workload profile, user requirements, and a state of the datacenter cluster, wherein an optimistic resource allocation method is selected for at least a first one or more of the schedulers and a pessimistic resource allocation method is selected for at least a second one or more of the schedulers; receiving new workloads; classifying the new workloads; based on the classifying of the new workloads, determining whether to i) assign the new workloads to an existing one of the schedulers or ii) create one or more new schedulers and assign the new workloads to the one or more new schedulers; identifying conflicts in scheduler decisions; and selecting resolution policies for the conflicts.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for automatically selecting an optimistic or a pessimistic resource allocation method for parallel schedulers based on workload profile, user requirements, and datacenters' states (i.e., the present techniques can be used to manage the states of multiple datacenters). More specifically, the present techniques guarantee pessimistic full resource pre-allocation, semi-pessimistic partial resource pre-allocation, or optimistic non-resource pre-allocation—where pre-allocation means blocking the resources (i.e., holding the resources so as to be able to assign the resources to a workload). The resources that are not pre-allocated in the allocation phase (i.e., due to optimistic resource allocation) may be competed for at the time of commit since there are parallel schedulers that might compete amongst themselves for the same resources. The resource competition, once identified, may be resolved based on a policy and techniques are provided herein for resolving conflicts that may arise. Optionally, the user can switch from optimistic to either semi-pessimistic or pessimistic resource allocation based on the performance or the state of the datacenter. Additionally, the present techniques improve resource utilization by not having all of the schedulers pre-allocated (and thereby avoid blocking idle resources). The present techniques can be extended to multiple/hybrid cloud resource allocation.

Based on the implementation of parallel schedulers, the present techniques can leverage the benefits of Monolithic, Two-level, and Shared-state scheduler architectures without suffering their above-described drawbacks. More specifically, the invention relies on a hybrid method that might have schedulers which in a pessimistic approach pre-allocate all of the resources; schedulers which in a semi-pessimistic approach pre-allocate part of the resources; and/or schedulers which in an optimistic approach share the resources among themselves. Pre-allocation means the reservation of the resources. The scheduler resource allocation type can be interchangeable according to the workload's profile, users' requirements and/or datacenters' states. The decision on selecting one or another scheduler resource allocation type might rely on how much resource allocation guarantee will be provided and the scheduler scalability (based, for example, on the flexibility of the scheduler to be able to take into account different requirements and meet those requirements). The decision based on the workload's profile will insure resource allocation for some class of workloads. The decision based on the user's requirements will insure resource allocation according to the Service Level Agreement (SLA). The decision based on the datacenter state will relieve the schedulers racing problem during resource shortage. Additionally, the present techniques improve resource utilization by not letting all of the schedulers pre-allocate the resources, which will therefore reduce blocking of an idle resource.

By way of example only, some notable advantages of the present teachings include 1) automatically creating scheduler instances with pessimistic full pre-allocation of resources, semi-pessimistic partial pre-allocation of resources, or optimistic non pre-allocation of resources; 2) adaptively selecting the resource allocation type based on the workload profile, user requirements and datacenter/cluster state; 3) dynamically switching from optimistic to semi-pessimistic or pessimistic resource allocation based on i) a user's decision (either manually or automatically—i.e., as stated in a user request) and/or ii) a change in datacenter state; and 4) expanding to multiple clouds/hybrid with the same logic.

Thus in accordance with the present techniques, datacenter scalability can be achieved through the use of multiple parallel schedulers. Guaranteed resource allocation is possible for a given set of schedulers. Either manual or automated selection for pessimistic, semi-pessimistic or optimistic resource allocation for schedulers is possible. Further, resource wasting due to schedulers holding idle resources is minimized. By comparison, conventional solutions for cluster resource allocation only pre-allocate all resources for schedulers or do not allocate any resource for schedulers. Moreover, the schedulers that do not pre-allocate resources cannot guarantee resource allocation. Finally, there is no way to switch from pessimistic to semi-pessimistic or optimistic resource allocation for schedulers.

A detailed description of the present techniques is now provided. As highlighted above, the present resource allocation techniques rely on a hybrid method that is composed of (multiple, parallel) schedulers in pessimistic, semi-pessimistic, and optimistic resource allocation approaches. The pessimistic approach pre-allocates all of the resources in order to guarantee the deployment. The semi-pessimistic approach pre-allocates only part of the resources thus insuring availability of only a part of the resource. The optimistic approach does not pre-allocate resources and only allocates the resources at the time of transaction commit. One might decide when to select between these approaches by analyzing workload class, user SLA, and/or the datacenter state. By way of example only, on one hand some workloads or users might have priority, and for those workloads/users schedulers will preferably always pre-allocate resources. By priority it is meant, for example, that some (high priority) workloads may have less tolerance to latency and hence may be required to be placed before other lower priority workloads which arrived at the same time or sooner than the high priority workload. On the other hand, resource pre-allocation processes might introduce delays and an optimistic parallel approach may have faster allocation resulting in a few conflicts. Pre-allocation, partial pre-allocation, and post-allocation might be interchangeable according to the user and workload goals, and datacenter state based on resource abundance or shortage. As highlighted above, pre-allocation involves reserving resources before placement is made hence guaranteeing to give those resources to the requests. In post-allocation, resources that the scheduler decides to take are not guaranteed—meaning that they might be taken by other requests while the scheduler is making the decision.

Figure 1:
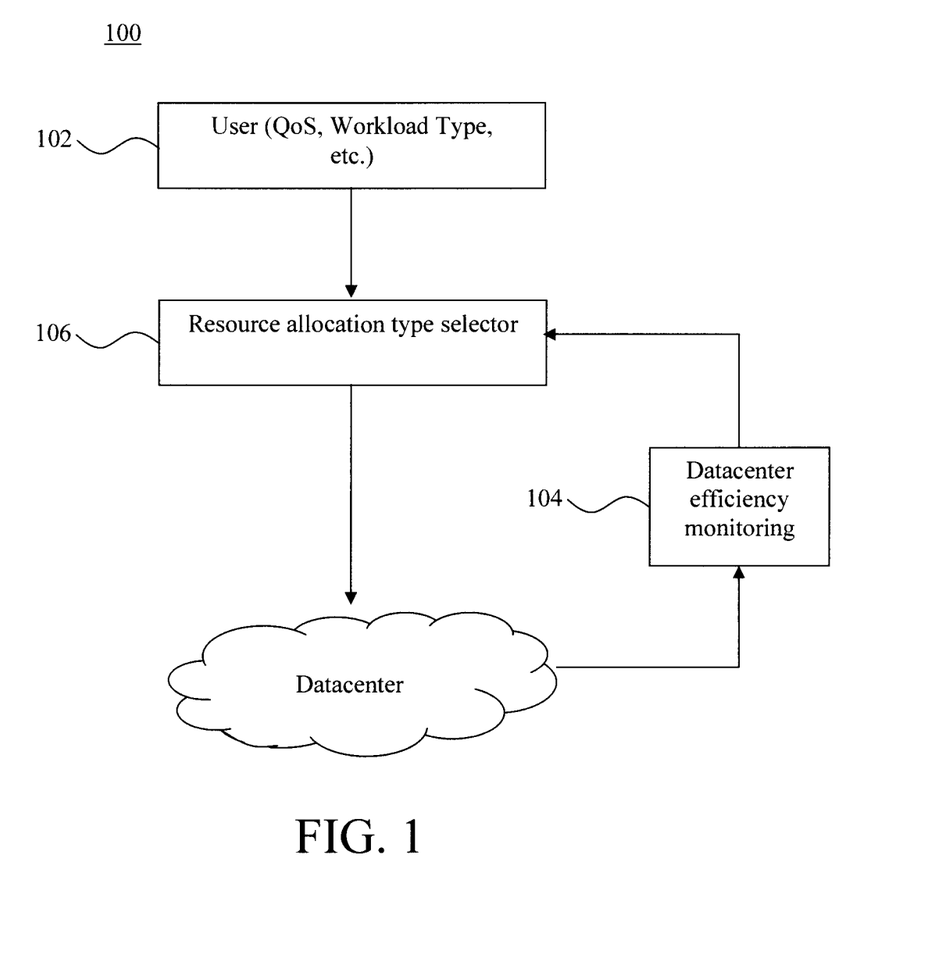
FIG. 1 is a schematic diagram illustrating an exemplary methodology for allocating computing resources in a datacenter cluster using an automatic resource allocation selector according to an embodiment of the present invention.

Methodology 100 of FIG. 1 provides a high-level overview of the present techniques for an exemplary embodiment involving one datacenter cloud. User input is provided in step 102. According to an exemplary embodiment, in step 102, a user can provide input regarding user requirements (such as quality of service (QoS)), workload profile (e.g., workload type, what workloads should receive priority, etc.). Any suitable QoS metrics known in the art for assessing workload performance (i.e., as seen by the user) may be employed in accordance with the present techniques.

The user input data is provided to an automatic resource allocation selector. As provided above, the present resource allocation techniques also take into account the state of the datacenter. Thus, in step 104, datacenter efficiency monitoring data is also provided to the automatic resource allocation selector. The datacenter efficiency monitoring collects data regarding the state of the datacenter such as CPU utilization, memory utilization, and so forth. The monitoring can be made via a datacenter efficiency monitor. The datacenter efficiency monitor can pass these metrics to a resource allocation type selector where the scheduling decision happens. See for example datacenter efficiency monitor 218 and resource allocation type selector 206 in FIG. 2—described below. One way of evaluating this data is to assign conditions on the utilization levels for the resource manager to take actions. For example, if CPU utilization goes below x %, then the scheduler may perform more optimistic scheduling in order to assign more requests to the resources in a faster manner.

In step 106, the resource allocation type selector automatically determines the number of schedulers and their set up. Specifically, according to an exemplary embodiment, the resource allocation type selector automatically selects a resource allocation method (optimistic, pessimistic, or semi-pessimistic) for each of the (multiple, parallel) schedulers (based on the data collected from step 102 and step 104).

Figure 2:
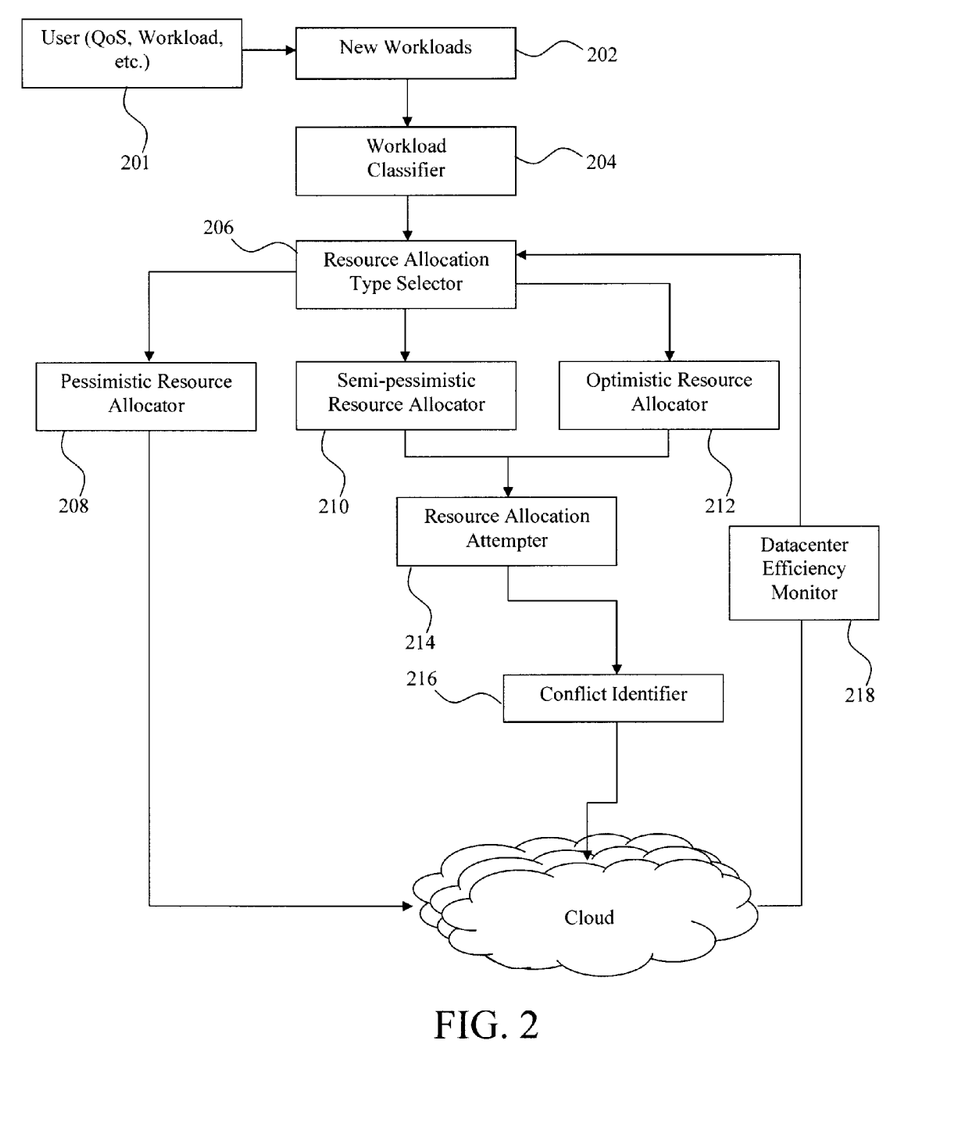
FIG. 2 is a diagram illustrating an exemplary implementation of the automatic resource allocation selector according to an embodiment of the present invention.

FIG. 2 is a logical flow diagram illustrating how the automatic resource allocation selector operates according to an exemplary embodiment. As shown in FIG. 2, a workload classifier 204 classifies a new workload 202. As described above, the present resource allocation process takes into account user input 201 (as well as the state of the datacenter—e.g., as determined by data center efficiency monitoring). Based on the workload classification from workload classifier 204, a resource allocation type selector 206 determines the number of schedulers and their set-up. This involves deciding whether or not new schedulers need to be added and/or existing schedulers need to be removed, and which resource allocation model to use. Exemplary functional model and rule-based mechanisms that may be implemented for this purpose are described below. Yet another way for solving this problem can be through use of a Machine learning algorithm for selecting the resource allocation type.

The resources are then allocated to the schedulers accordingly—via a pessimistic resource allocator 208, a semi-pessimistic resource allocator 210, and an optimistic resource allocator 212. The schedulers that have pre-allocated resources (i.e., the schedulers with pessimistic resource allocation types) will have no conflicts and thus no problems to commit the decisions. On the other hand, the schedulers that do not have pre-allocated resources or at least part of them (i.e., the schedulers with optimistic or semi-pessimistic resource allocation types, respectively) will take a snapshot of the current available resources and plan the decisions based on it. After a decision is made, the schedulers will (i.e., via resource allocation attempter 214) attempt to commit the decision subject to race conditions among the other concurrent schedulers. As shown in FIG. 2, this may result in a conflict. If a conflict is identified (i.e., via conflict identifier 216), the conflict and its characteristics are stored in the datacenter state in order to monitor the efficiency of the datacenter (i.e., via datacenter efficiency monitor 218). As provided above, the datacenter efficiency monitor collects data regarding the state of the datacenter such as CPU utilization, memory utilization, and so forth—which it passes on to the resource allocation type selector where the scheduling decision happens.

Figure 3:
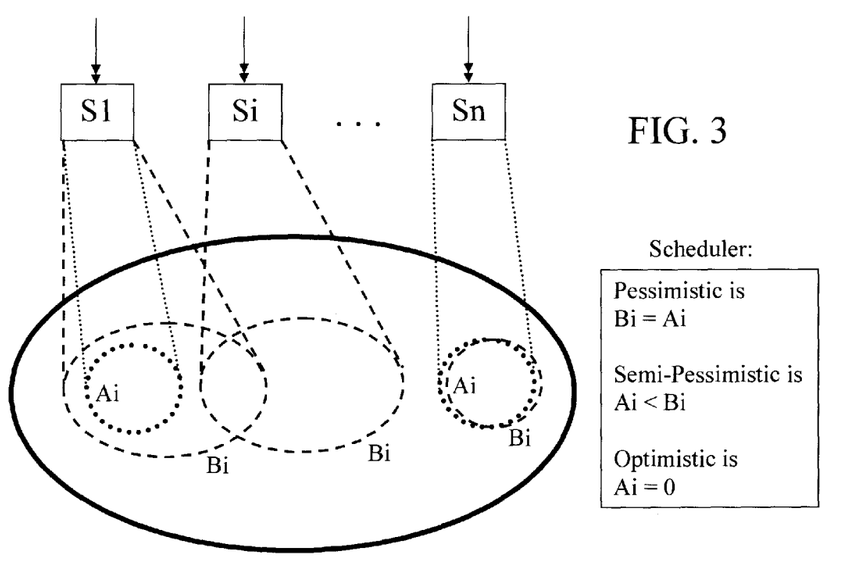
FIG. 3 is a diagram illustrating possible resource allocation types for schedulers according to an embodiment of the present invention.

FIG. 3 is a diagram illustrating the possible resource allocation types for schedulers (S1, Si . . . Sn). In FIG. 3, the following assumptions are being made:

R is the set of all datacenter resources;

$A_i$ is the pre-allocated resource of a scheduler$_i$, where i represents 0 up to n schedulers;

$B_i$ is the post-allocate resource of a scheduler$_i$, where i represents 0 up to n schedulers;

$\cap_{i=1}^{n} A_i = 0$;

$A_i \subseteq B_i$;

$\cup_{i=1}^{n} A_i \subseteq R$; and $\cup_{i=1}^{n} B_i \subseteq R$.

If the datacenter cluster has a Monolithic scheduler, then i=1 and $A_i=B_i=R$. If the datacenter cluster has multiple schedulers all of which have all of the resources pre-allocated (pessimistic), then $\cup_{i=1}^{n} A_i = R$ and $B_i=A_i$. If the scheduler has only part of the resources pre-allocated (semi-pessimistic), then $A_i < B_i$. Finally, if the scheduler has no pre-allocated resources (optimistic), then $A_i=0$. When a scheduler is created, the $A_i$ and $B_i$ is defined accordingly to the workload's profile, user requirements, and datacenter cluster state. However, the size of $A_i$ and $B_i$ might also change based on user decision or feedback (e.g., regarding datacenter efficiency) from the datacenter cluster. If $A_i$ changes the scheduler will have more or less pre-allocated resource, and if $B_i$ changes the scheduler will compete more or less for resources.

As highlighted above, the user's requirements might be related to metrics based on any standard QoS metrics for workload performance known in the art. By way of example only, see U.S. Patent Application Publication Number 2015/0012634 by Zhu et al., entitled "Performance Interference Model for Managing Consolidated Workloads in Qos-Aware Clouds" (which describes a suitable time-based QoS metric). The user's requirements might also be related to metrics based on the number of cancelled schedulers' decisions, Goodput of schedulers (i.e., the throughput—such as the number of information bits delivered to a destination per unit time), the time to deploy the workload, number of schedulers, etc. The workload profile will describe these metrics plus more specific metrics based on: priorities, amount of required guaranteed resources, amount of flexible resource allocation (part of the workload might go for another), etc. The datacenter state metrics are related to: the number of cancelled schedulers' decisions, the number of available resources, resource usage versus resources pre-allocated, etc. The number of schedulers is a way to control the goodput—the more schedulers, the more requests are processed at a time (Throughput), however conflicts may cause some of the requests to fail hence goodput may drop. Some users may indicate the number of schedulers that they want the cloud provider to use in order to increase the throughput.

All of these metrics are used (e.g., by the resource allocation type selector 206—see FIG. 2) to decide on a scheduler composed by pessimistic, semi-pessimistic, or optimistic resource allocation. Additionally, the metrics are used to define the scalability level by creating new parallel schedulers. Those decisions are based on trade-offs between scheduler scalability, scheduler performance, schedulers guaranteed resource allocation and cluster resource usage. More specifically, scalability is related to having more parallel schedulers. Scheduler performance relies on the scheduler response time, cancelled decisions, and global view of the resources to better plan the deployment. Scheduler guaranteed resource allocation is directly related to the datacenter resource usage. Namely, a scheduler may waste resources by using only a few of the resources in a pre-allocated pool, which avoids the best cluster utilization. Because of some schedulers wasting resources, the cluster might not scale up to the demand. The shared resource might solve this problem but includes the resource-racing problems described above. Hence, through these trade-offs the scheduler resource allocation type will be defined. By way of example only, given these tradeoffs an optimized solution may be determined using a functional model. An exemplary optimized solution determined using a functional model is given below.

As provided above, functional models and/or rule-based mechanisms may be used to decide whether or not new schedulers need to be added and/or existing schedulers need to be removed, and which resource allocation model to use. Exemplary functional model and rule-based mechanisms are now described.

Functional Model:
essentially, the User will come with a set of requirements along with the workload characteristics by looking at the system state. The present techniques will decide on the size of n, B and A.

User Parameters(QoS, Workload, etc)→requirements
QoS(Desired rejection rate, conflict rate, etc.)
Workload(# of virtual machines (vms), constraints, demand, etc.)
Datacenter Parameters(Datacenter Location (ID), Idle machine rate, # of conflicts)
Resource allocation Parameters (A, B, n)
F(User, Datacenter, Resource allocation parameters)= Main Objective
Main Objective=weight1*user objective (obj)+weight2*datacenter objective (obj)
User obj=Normalized(SLA defined, QoS, etc.)
Datacenter obj=Normalized(high machine utilization, etc.)
For a given main objective value, user parameters, datacenter parameters, and desired resource allocation parameters can be derived from the F function.

Example

A user may specify a QoS to have less than 10% conflicts, and have a storage intense workload with a lot of transactions. The datacenter can be in a state where there are 3 parallel schedulers in a shared state with A=B, hence we have A_i=B_i where i=1, 2, 3. Say for example that the datacenter has 40% idle machines (vms) when the new request comes.
F(0.1, Storage, High Transactions, 0.4, (A_i=B_i, n=3))= Desired objective value
User objective=1−conflicts=1−0.1=0.9
Datacenter objective=none
Desired objective=0.9, hence
F(0.1, Storage, High Transactions, 0.4, (A_i=B_i, n=?))= 0.9
When one solves F for (A_i=B_i, n=?)) and find the A_i, B_i and n values.
Thus, according to the present techniques, one can readily determine the A_i, B_i, and n values—and define optimistic, pessimistic and semi-pessimistic with the subsets of A, B and n.

Figure 4A:
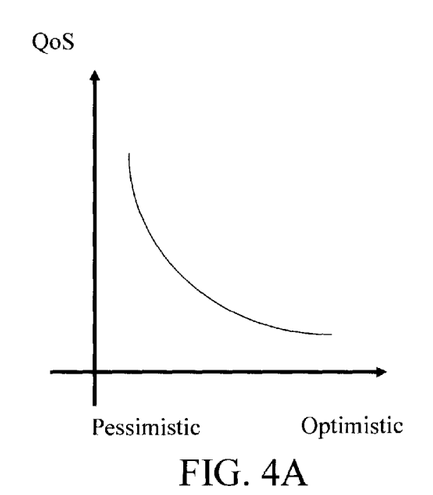
FIG. 4A is a diagram illustrating how quality-of-service (QoS) can be increased for a given workload type by decreasing the number of schedulers according to an embodiment of the present invention.
Figure 4B:
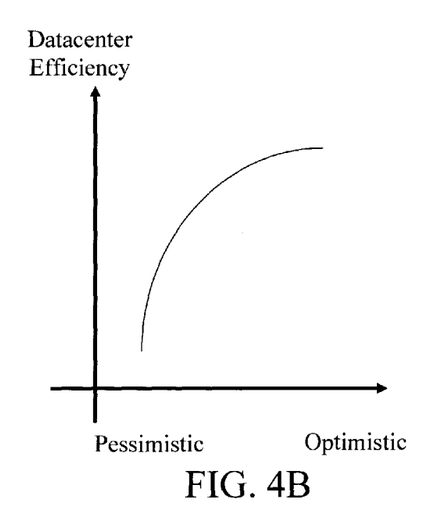
FIG. 4B is a diagram illustrating how datacenter efficiency can be increased for a given workload type by increasing the number of schedulers according to an embodiment of the present invention.

Rule Based Model:
this is a simpler model where rules are defined on the user QoS, workload types, and datacenter state. For instance, if a user is experiencing low QoS in terms of conflict rates, one can decrease the number of schedulers and set A=B. If a datacenter is experiencing low efficiency, then one can increase the number of schedulers and set A<B. FIGS. 4A and 4B depict these behaviors per a workload type.

As provided above, the present automatic resource allocation selector classifies new workloads (i.e., via workload classifier 204—see FIG. 2), identifies conflicts for pre-allocated resources in the case of semi-pessimistic or optimistic resource allocation (i.e., via conflict identifier 216), and institutes conflict resolution to resolve the conflicts. Techniques are now described for automatically classifying workload bottlenecks, identifying conflicts between schedulers' decisions, and selecting a policy to resolve those conflicts.

The workload classification, conflict identification, and resolution policy selection phases consider different types of conflicts, workload characteristics, and infrastructure information. In accordance with the present techniques, all of those phases are configured to recommend a conflict resolution policy that best satisfies the user's requirements and reduces the schedulers' cancelled decisions—therefore improving the goodput. The present techniques not only provide a process for conflict resolution policy selection, but also detail methods for extracting metrics from the infrastructure such as number of cancelled decisions, allocation response time, and workload Quality-of-Service (QoS) to feed the learning mechanism. Additionally, actions are proposed herein for conflict resolution by considering workload migration and resource waiver—thus providing many more possible policies.

To perform each (classification, identification, and policy selection) phase, the present techniques employ memory-based and/or model-based collaborative filtering algorithms to handle sparse inputs and recommend workload classification, collision/conflict identification and policy selection. As will be described in detail below, each of the phases employs specific matrices. For example, in general the classification phase will involve multiple utility matrices composed of workload profiles as rows and CPU, network, memory, or disk as columns and entries as intensiveness resource usage rating.

The identification phase is composed of multiple matrices with the rows as schedulers' decision combinations and the columns varying between the previous mentioned attributes (i.e., CPU, network, memory, or disk) and datacenter cluster states. The entries for the matrix with CPU, network, memory, or disk as columns are the workload performance interference rating. One of the matrices is composed of datacenter cluster states and has as entries server overloading which is the proportion of workloads resources allocation and the server available resources. The other matrix with datacenter cluster states as columns has entries as missing resources where the entries are 1 if the server fits the workloads else 0.

Finally, in the policy selection phase there are two matrices with the rows as conflicted schedulers' decision plus the delayed ones (because of the applied policy), the columns as policy resolution type, and entries as workload cancellation rating or workloads performance. Initially, only a few entries might be filled in each matrix. A likelihood algorithm will be used to fulfill the missing entries across all columns in the utility matrix resulting from matrix factorization. The initial entries may be provided by a specialist, or from the workload profile with any optional parameters provided by expert users, or using off-line simulations and/or random values. The option of using random values is included because even in the absence of expert or simulation data at least one value is required to perform collaborative filtering. Additionally, the administrator can provide the values using utility functions for each characteristic that has the result normalized between a maximum and minimum rating. Finally, some entries will be provided and updated from parameters collected in a previous deployment(s) using a dynamic self-learning mechanism.

By way of example only, some notable advantages of the present teachings include: 1) the automated selection of conflict handling policies to resolve allocation conflicts using as input the previous workload classification and dynamic metrics from the infrastructure in a cloud computing environment; 2) the automated identification of conflicts based on interferences among the workloads, the probability of server overloading, and resource availability in the cloud computing environment; 3) the automated classification of workloads based on CPU, network, memory and disk usage intensiveness; 4) the learning mechanism for the workload classification, conflict identification and policy selection by observing the number of cancelled decisions, application interference, and datacenter cluster state from a previous deployment(s); and 5) infinite conflict handling policy combinations by considering the actions as workload migration and resource waiver.

Thus in accordance with the present techniques, workloads conflicts resolution can be performed using sparse inputs that minimize scheduler decision cancellations, application interferences, and server overloading. The processes of dynamic workload classification, conflict detection, and policy selection can be coupled with knowledge gleaned from previous deployments using a machine learning mechanism. New policies for conflict resolution can be recommended based on workload migration, denial and cancellation of decisions, and/or resources waiver and waiting.

Existing solutions for conflict resolution policy selection focus only on classification based on machine learning mechanisms that require large datasets for the test phase, and classifications that do not consider the workload constraints, performance, and the datacenter state at the same time for a more accurate decision. Additionally, existing conflict resolution solutions do not contemplate learning mechanisms that consider the number of scheduler decision cancellations, workload performance, and/or the datacenter cluster state from a previous deployment(s). Moreover, in all phases the present techniques break down the problem into many parts for classification that have collaborative filtering instance being executed in parallel to speed up the process and improve the schedulers' response time. Finally, existing solutions do not consider specific types of conflict resolution actions, such as workload migration and resource waiver.

A detailed description of the present techniques for workload classification, conflict identification, and conflict resolution policy selection is now provided. The present techniques propose a framework to automatically select conflict resolution policies for optimistic (i.e., optimistic or semi-pessimistic—see above) parallel workloads deployment. The process is illustrated in accordance with methodology 500 in FIG. 5, and contemplates three phases. In the first phase (1) new workloads arrive in step 502, and in step 504 the workloads are classified based on their resource demand (e.g., CPU, memory, network, and/or disk intensiveness—see below). Step 504 may be carried out, e.g., by the workload classifier 204 (see FIG. 2).

Figure 5:
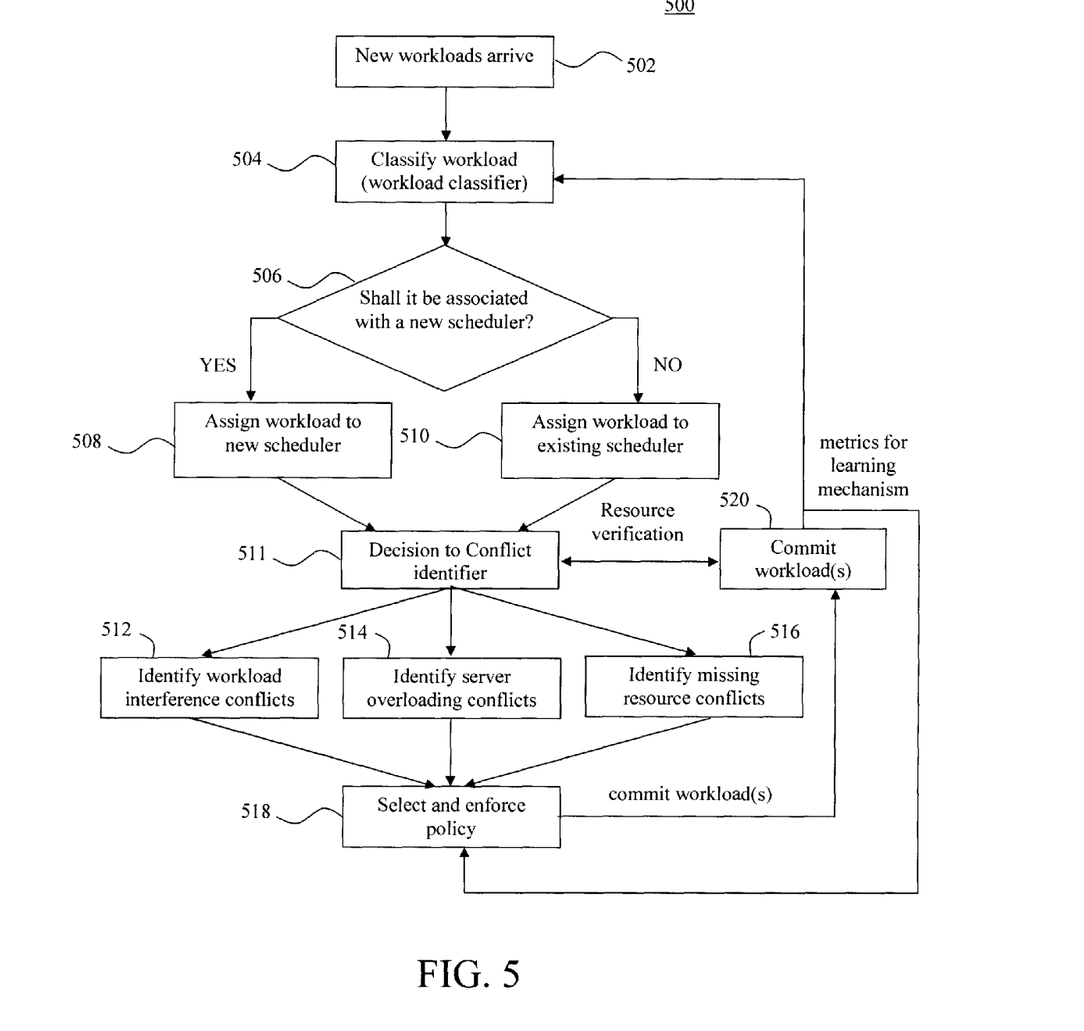
FIG. 5 is a diagram illustrating an exemplary methodology for automatically selecting conflict resolution policies for optimistic parallel workloads deployment according to an embodiment of the present invention.

The second phase (2) begins with a determination being made in step 506 as to whether the workload should be forwarded to an existing scheduler or a new scheduler created for the workload. When the demand of such a workload type is high, a new workload specific scheduler preferably is created to scale up to the demand. In that case, the workload is assigned to a new scheduler in step 508. On the other hand, if a new workload specific scheduler is not needed, then the workload is assigned to an existing scheduler (i.e., the current scheduler) in step 510.

After a scheduler makes a decision, in step 511 the scheduler forwards the decision to the conflict identifier (i.e., conflict identifier 216—see FIG. 2) which in steps 512-516 executes parallel identifications for conflicts (interferences) among the workloads, possible server overloading, and missing resources. Resource verification is done to check if there are enough resources to make the placement. This is also where the conflicts are detected since one placement becomes successful and the other one fails due to not having enough capacity. According to an exemplary embodiment, steps 512-516 are carried out using a workload interference conflict identifier, a server overloading conflict identifier, and a resource missing conflict identifier, respectively, which may all be components of the conflict identifier 216.

A conflict occurs when the multiple schedulers' decisions choose the same host to place the request where the host can only accommodate one of the decisions. If conflicts are identified between schedulers' decisions, then the third phase begins. In the third phase (3), based on the possible conflicts identified in steps 512-516, policies are recommended in step 518 to resolve the conflicts so as to relieve cancellations and maintain a higher workload performance. According to an exemplary embodiment, step 518 is performed using a policy selector and enforcer.

After the conflicts have been resolved, the workloads are committed to the datacenter infrastructure in step 520. As will be described in detail below, a self-learning mechanism is used to update the workload classifications and/or policy selection process based on data from one or more previous iterations of the method. See FIG. 5.

All of the phases involve using utility matrices which describe the schedulers' decisions. For instance, the first phase has a matrix with workloads as rows, and the second and the third phases have the combination of the scheduler's decisions as rows. According to an exemplary embodiment, a three-step process is used to fill in the matrix entries. In the first step, as highlighted above, initial entries to the matrix are provided from workload profiles, specialists, off-line simulations, utility functions, or even some random values.

In the second step, the missing entries of the matrix derived from matrix factorization will be filled using log-likelihood algorithms. The log-likelihood function is given by $\Sigma_i \log(f(x_i))$, where $f(x_i)$ is the probability density function at $x_i$ and $x_i$ represents the $i^{th}$ observation. The matrix factorization can be archived using the methods Single Value Decomposition (SVD), Non-negative Matrix Factorization (NMF), Bayesian Matrix Factorization among many others. The matrix factorization is used for dimensionality reduction, where the representation of items that share substructure become more similar to each other, and items that were divergent may become more divergent as well. The process to define divergence and similarity is used for recommendation.

Finally, the third and continuous step updates some entries based on the previous deployment and measurements from the datacenter cluster state as cancellation rate and workload performance. However, if the difference of the previous entry and the new entry is higher than h where h>0, an attempt counter n is associated to the field, where n>0. Then, after n attempts, the entry will be updated with the mean of attempt values, except outliers (i.e., outliers—found using, e.g., exploratory data analysis (EDA)—are eliminated before using the data for prediction). This third phase provides a self-learning mechanism.

The second step for filling the missing entries of the matrix derived from matrix factorization is now described in further detail.

In the phase (1), the workload classification characteristic may include:

i. CPU intensiveness rate, representing the combination of average CPU usage and CPU effects on workload performance;

ii. memory intensiveness rate, representing the combination of average memory usage in megabytes MB or gigabytes GB and memory effects on workload performance;

iii. disk intensiveness rate, representing the combination of average disk usage in MB, GB, or terabytes TB, and memory effects on workload performance;

iv. network bandwidth intensiveness rate, representing the combination of average bandwidth usage in MB or GB, and network bandwidth effects on workload performance;

v. network response time intensiveness rate, representing the combination of average response time and response time effects on workload performance;

vi. network jitter intensiveness rate, representing the combination of jitter average, and jitter effects on workload performance;

vii. more parameters can be included.

The workload classification is able to recommend a type of new incoming workload given the classification of a few previous workloads. The recommendation will evince the characteristic of the workload. Multiple matrices compose this phase with workload profiles as rows and workload characteristics as columns and entries as intensiveness resource usage rating. Some initial entries rely on customized utility functions used by a specialist. The utility function can be provided by the user in the workload profile, the specialist, or it can be the ones proposed herein. All workload characteristics are classified within some ranking interval from 0 to 1, where 0 represents 0% of correlation and 1 represents 100% of correlation with older (historical) characteristics.

An exemplary implementation describes utility functions to evaluate each workload characteristic and another one to evaluate all the workload characteristics together as follows:

For CPU intensiveness evaluation:

$$f_{CPU} = \left[ j * \frac{CPU_{avg\,usage} * \#\,requests}{CPU_{max\,usage} * \#\,requests} + k * \frac{ExcTime_{max} - ExcTime_{normal}}{ExcTime_{max}} \right] / j + k$$

wherein the $ExcTime_{normal}$ parameter is the average execution time when the workload has all of the available CPUs allocated; the $ExcTime_{max}$ parameter is the average execution time when the workload has only z % of the CPUs allocated, where z<maximum CPU number; the j parameter is the weight for CPU usage and the k parameter is the weight for execution time.

For memory intensiveness evaluation:

$$f_{mem} = \left[ j * \frac{memory_{avg\,usage}}{memory_{max\,usage}} + k * \frac{ExcTime_{max} - ExcTime_{normal}}{ExcTime_{max}} \right] / j + k$$

wherein the $ExcTime_{normal}$ parameter is the average execution time when the workload has all the available memory allocated; the $ExcTime_{max}$ parameter is the average execution time when the workload has only z % of memory allocated, where z<maximum of available memory; the j parameter is the weight for memory usage and the k parameter is the weight for execution time.

For disk intensiveness evaluation:

$$f_{disk} = \left[ j * \frac{data\ transfer\ rate_{avg} * \#\,disks}{data\ transfer\ rate_{avg} * \#\,disks} + k * \frac{ExcTime_{max} - ExcTime_{normal}}{ExcTime_{max}} \right] / j + k$$

wherein the $ExcTime_{normal}$ parameter is the average execution time when the workload has all the available disks allocated; the $ExcTime_{max}$ parameter is the average execution time when the workload has only z % of available disks allocated, where z<maximum available disk number; the j parameter is the weight for data transfer rate and the k parameter is the weight for execution time.

For network bandwidth intensiveness evaluation:

$$f_{bandw} = \left[ j * \frac{bandwidth_{avg\,usage}}{bandwidth_{max\,usage}} + k * \frac{ExcTime_{max} - ExcTime_{normal}}{ExcTime_{max}} \right] / j + k$$

wherein the $ExcTime_{normal}$ parameter is the average execution time when the workload has all the available network bandwidth allocated; the $ExcTime_{max}$ parameter is the average execution time when the workload has only z % of the network bandwidth allocated, where z<maximum available bandwidth; the j parameter is the weight for bandwidth usage and the k parameter is the weight for execution time.

For network response time intensiveness evaluation:

$$f_{respTime} = \frac{ExcTime_{max} - ExcTime_{normal}}{ExcTime_{max}}$$

wherein the $ExcTime_{normal}$ parameter is the average workload execution time when the network has the minimum response time, the $ExcTime_{max}$ parameter is the average workload execution time when the network has the maximum response time. The term "response time," as used herein refers to the time elapsed between the end of a request and the beginning of the response which can vary accord to the network latency.

For network jitter intensiveness evaluation:

$$f_{jitter} = \frac{ExcTime_{max} - ExcTime_{normal}}{ExcTime_{max}}$$

wherein the $ExcTime_{normal}$ parameter is the average execution time with the minimal network jitter, the $ExcTime_{max}$ parameter is the average execution time with the maximum network jitter. This implementation understands jitter as the variation in the response time.

To evaluate the combination of all characteristics, this exemplary implementation provides the following utility function:

$$f_{average} = \frac{\sum_{1}^{n} [(w_n + xq_n)/x + 1] * f_n}{n}$$

wherein the $f_i$ (i=1 to n) represents the n workload characteristics rating, the $w_i$ parameter represents a weight from the workload profile provided by the user, the $q_i$ parameter represents a weight determined by the specialist, the x parameter represents the weight for the specialist weight determined by the cluster administrator. The result of the function will be a value between 0 up to 1, where 0 represents workload free resource intensiveness and 1 represents workload heavy resource intensiveness. This evaluation might be an additional column in the matrix.

In phase (2), the schedulers' decision conflicts identification might include the following characteristics:

CPU interference rate, representing low performance of one or more workloads running in the same host because they are CPU sensitive;

memory interference rate, representing low performance of one or more workloads running in the same host because they are memory sensitive;

disk interference rate, representing low performance of one or more workloads running in the same host because they are disk sensitive;

network interference rate, representing low performance of one or more workloads running in the same host because they are network sensitive;

server overloading, representing that the deployment of one or more workloads might overload some server resource and compromise the overall server performance;

resource missing, representing that if one or more scheduler decisions allocate the desired resources then another one or more schedulers decisions will not have available resources to deploy their decisions.

As with the previous phase, the conflict identification will recommend the possible conflicts detected in the combination of scheduler decisions. The conflict detection can occur during the scheduler execution, or after all of the decisions have been made. The former is a pessimistic approach and the schedulers will provide partial and incremental decisions for the conflict identifier (CI). The latter is an optimistic approach and the schedulers will plan all of the resources before sending the decisions to the conflict identifier. In both cases, the conflict identifier will combine all of the decisions received and match their workloads classification to rate the conflicts. In each matrix, the schedulers' decision combinations are the rows of all matrices, and workload characteristic or datacenter cluster states are the columns. The schedulers' decision combination can be taken by two workloads or by a set of workloads. The matrix with the column workload characteristic has entries as interference ratings, which is the average of workloads resources intensiveness rate. The other two matrices have the column as datacenter cluster states. One matrix with datacenter cluster states as columns has entries, as server overloading that is the proportion of the sum of resource usage demand from the workload profile per total number of server's available resources.

Another matrix with datacenter cluster states as columns has entries as 0 if there are no available resources for the decisions, else 1. The latter matrix is the only one that has information directly collected from the infrastructure. During the recommendation process, a conflict is identified when the rate is higher than z, where 0<z≤1.

In phase (3), the policy selection criteria can include:

cancellation rate, representing the probability of cancellation of a scheduler's decision. Some policies can resolve the conflict by waiting, migrating, or waiving the resource instead of cancel the entire decision.

workload performance rate, a class of workloads might benefit from different policy resolutions. For instance, the ones that are migrated or waive resources may have some performance decrease according to the user-defined QoS. Moreover, some policies might accept server overloading of some resources, which can probability direct affect the performance of one or more workloads.

After a conflict is identified, the policy selector and enforcer (PS) is called to recommend a policy to solve the conflict. The policy selector and enforcer is composed of two matrices with the rows as the combination of the conflicted schedulers decision plus the delayed ones, and the columns as policies. The two matrices differ by the entries where one is filled with cancellation rate and the other with workload performance rate. The cancellation rate represents the proportion between the numbers of cancellations that occurred using the policy by the total number of cancellations that occurred in the cluster during the time interval $t_y$ to $t_x$, where the parameter x changes every time the datacenter cluster state changes. The datacenter cluster state represents a rating from resource shortage to abundance, and also the rate of schedulers' decision cancellations and workloads performance rate. Some policies might perform better during resource abundance and others during shortage. The performance rate might be evaluated according to the workload intensiveness rate and measuring the execution time and/or response time for the respective critical characteristic. Those performance parameters might be provided from the workload profile, from specialist knowledge, and from previous deployment(s). The performance depends on the selected policy, because a server overloading can be accepted or not and/or low priority workloads can be migrated providing more resources for high priority decisions. Hence, a set of policy actions can affect the workloads performance differently.

The present techniques also describe some possible policies based on the transactional world but adapted for the cluster context. Also, the present techniques describe new policies based on the combination of known action plus resource waiver, and workload migration and awareness:

Randomly.

This is the simplest policy that randomly selects the winner scheduler decision.

Back-Off.

Randomly select the winner scheduler decision. The loser will use exponential delay for a fixed number of exponentially growing intervals before cancelling. After each interval, the loser scheduler decision checks if the other has finished.

Privileged 1.

Each workload has a priority that can be specified by the user Service Level Agreement (SLA), by the administrator, or starting from 0 up to N. The scheduler decision with lower priority is delayed and priority increased for N times, where N is the difference in priorities, before cancelling the scheduler decision.

Privileged 2.

This policy is similar to Privileged 1, except that some scheduler decisions do not have their priority increased. Thus higher priorities are kept as high however low priority requests that do not get their priority increased may end up getting delayed more than once.

Elder.

A scheduler decision receives a timestamp when it starts its first attempt. If it is the first time for concurrent decisions, then one of the decisions is randomly delayed. If the concurrent decisions have different timestamps, then the younger decision is cancelled.

Elder End.

This policy is similar to Elder, except that this policy also has a timeout mechanism for the decisions that are never deployed.

Blacklist.

A scheduler decision receives a blacklist containing all of the decisions that were delayed. If the schedulers are not aware of other schedulers' decision, one decision is selected randomly to delay and is included in the blacklist. If one of the decisions is in the blacklist, it is canceled. If both of the decisions are in the blacklist, one is randomly selected.

Waiver.

A scheduler decision can abdicate the conflicting resources if possible. The user must specify it into the workload profile.

Waiver Time.

This policy is similar to Waiver, except it abdicates resources only after N attempts and cancels after M attempts, wherein N<M.

Migrate Low Priority.

If it is possible, migrate a low priority running workload in the conflicted server to release resources for the schedulers' decision.

Migrate Time.

This policy is similar to Migrate low priority, except it migrates the lower priority workload only after N attempts and cancels after M attempts, wherein N<M.

Shrink.

If it is possible, reduce the resource of a running workload to fit the schedulers' decision.

Shrink Time.

This policy is similar to Shrink, except it reduces the resource of a lower priority workload only after N attempts and cancels after M attempts, wherein N<M.

Back-Off Long-Term Aware.

If the long-term workload is the winner, do not delay, cancel the loser.

Many other combinations between the previous policies are possible.

The policy selection goal here is to relieve the conflict problem by reducing the cancellations and schedulers wasting time and improving the performance of the workload combinations. Hence, the policy selected will be the one that has the lowest cancellation rate possible and the highest possible performance rate.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
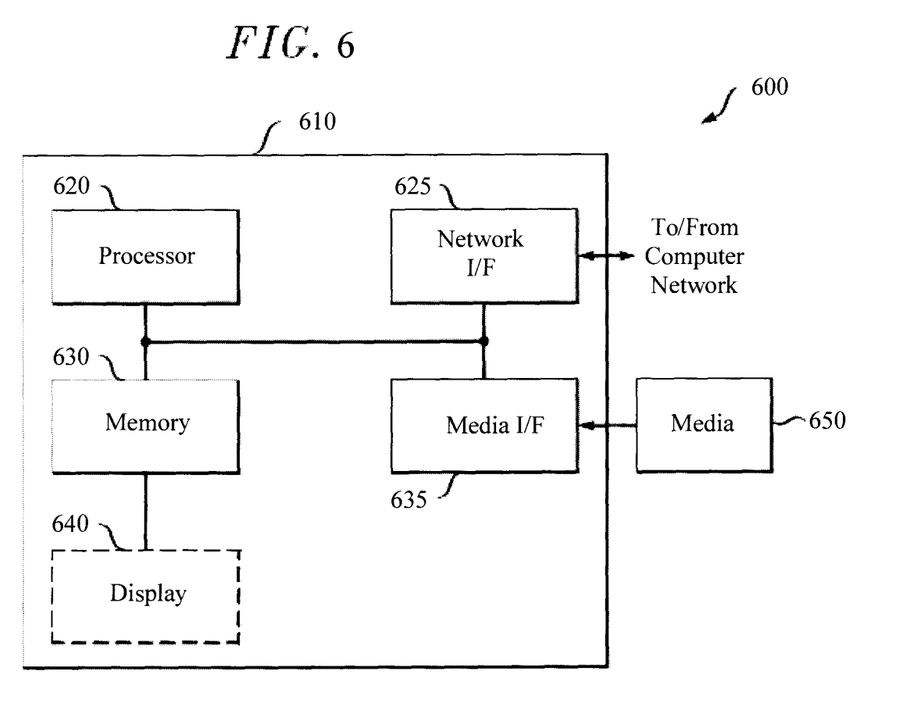
FIG. 6 is a diagram illustrating an exemplary apparatus for performing one or more of the methodologies presented herein according to an embodiment of the present invention.

Turning now to FIG. 6, a block diagram is shown of an apparatus 600 for implementing one or more of the methodologies presented herein. By way of example only, apparatus 600 can be configured to implement one or more of the steps of methodology 100 of FIG. 1 and/or one or more of the steps of methodology 500 of FIG. 5.

Apparatus 600 includes a computer system 610 and removable media 650. Computer system 610 includes a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for allocating computing resources in a datacenter cluster, the method comprising steps of:
creating multiple, parallel schedulers;
automatically selecting a resource allocation method for each of the schedulers based on one or more of a workload profile, user requirements, and a state of the datacenter cluster, wherein an optimistic resource allocation method is selected for at least a first one or more of the schedulers and a pessimistic resource allocation method is selected for at least a second one or more of the schedulers;
receiving new workloads;
classifying the new workloads; and
based on the classifying of the new workloads, determining whether to i) assign the new workloads to an existing one of the schedulers or ii) create one or more new schedulers and assign the new workloads to the one or more new schedulers, and any interferences among the new workloads are resolved by observing one or more of a number of cancelled decisions, and datacenter cluster state from previous deployments so as to relieve cancellations and thus maintain a higher workload performance.

2. The method of claim 1, wherein the pessimistic resource allocation method comprises one or more of full pre-allocation of the computing resources and partial pre-allocation of the computing resources, wherein the one or more of full pre-allocation and partial pre-allocation comprises blocking the computing resources.

3. The method of claim 1, wherein the optimistic resource allocation method comprises non-pre-allocation of the computing resources.

4. The method of claim 1, wherein the datacenter cluster comprises a cloud computing infrastructure.

5. The method of claim 4, wherein the cloud computing infrastructure comprises multiple clouds.

6. The method of claim 1, the steps further comprising a step of:
dynamically switching the resource allocation method of one or more of the schedulers from the optimistic resource allocation method to the pessimistic resource allocation method.

7. The method of claim 6, wherein the resource allocation method of the one or more of the schedulers is dynamically switched from the optimistic resource allocation method to the pessimistic resource allocation method either manually or automatically based on a user's decision.

8. The method of claim 6, wherein the resource allocation method of the one or more of the schedulers is dynamically switched from the optimistic resource allocation method to the pessimistic resource allocation method either manually or automatically based on a change in the state of the datacenter cluster.

9. The method of claim 1, wherein the new workloads are classified based on one or more of central processing unit (CPU), memory, network, and disk intensiveness.

10. The method of claim 1, wherein the new workloads are classified based on data from one or more previous iterations of the method.

11. The method of claim 1, the steps further comprising a step of:
identifying conflicts in scheduler decisions.

12. The method of claim 11, wherein the conflicts comprise one or more of workload interference conflicts, server overloading conflicts, and missing resource conflicts.

13. The method of claim 11, the steps further comprising a step of:
selecting resolution policies for the conflicts.

14. The method of claim 13, wherein the resolution policies for the conflicts are selected based on data from one or more previous iterations of the method.

15. A method for allocating computing resources in a datacenter cluster, the method comprising steps of:
creating multiple, parallel schedulers;
automatically selecting a resource allocation method for each of the schedulers based on one or more of a workload profile, user requirements, and a state of the datacenter cluster, wherein an optimistic resource allocation method is selected for at least a first one or more of the schedulers and a pessimistic resource allocation method is selected for at least a second one or more of the schedulers;
receiving new workloads;
classifying the new workloads;
based on the classifying of the new workloads, determining whether to i) assign the new workloads to an existing one of the schedulers or ii) create one or more new schedulers and assign the new workloads to the one or more new schedulers;
identifying conflicts in scheduler decisions; and
selecting resolution policies for the conflicts by observing one or more of a number of cancelled decisions, and datacenter cluster state from previous deployments so as to relieve cancellations and thus maintain a higher workload performance.

16. The method of claim 15, wherein the datacenter cluster comprises a cloud computing infrastructure.

17. The method of claim 16, wherein the cloud computing infrastructure comprises multiple clouds.

18. A computer program product for allocating computing resources in a datacenter cluster, the computer program product comprising a computer readable storage medium having program instructions embodied therewith, the program instructions executable by a computer to cause the computer to:
create multiple, parallel schedulers;
automatically select a resource allocation method for each of the schedulers based on one or more of a workload profile, user requirements, and a state of the datacenter cluster, wherein an optimistic resource allocation method is selected for at least a first one or more of the schedulers and a pessimistic resource allocation method is selected for at least a second one or more of the schedulers;
receive new workloads;
classify the new workloads;
based on the classification of the new workloads, determine whether to i) assign the new workloads to an existing one of the schedulers or ii) create one or more new schedulers and assign the new workloads to the one or more new schedulers;
identify conflicts in scheduler decisions; and
select resolution policies for the conflicts by observing one or more of a number of cancelled decisions, and datacenter cluster state from previous deployments so as to relieve cancellations and thus maintain a higher workload performance.

* * * * *